Sept. 28, 1965 R. H. FRICKE ETAL 3,209,276

MICROWAVE CAVITY HAVING PLURAL CAPACITANCE PROBES WHICH ACT AS A MODE SEPARATOR

Filed May 25, 1961 2 Sheets-Sheet 1

INVENTORS,
ROGER H. FRICKE &
JOSEPH F. Mc SPARRAN.
BY Harry M. Saragovitz
ATTORNEY.

INVENTORS,
ROGER H. FRICKE &
JOSEPH F. McSPARRAN.
BY
Harry M. Saragovitz
ATTORNEY.

United States Patent Office 3,209,276

Patented Sept. 28, 1965

3,209,276

MICROWAVE CAVITY HAVING PLURAL CAPACITANCE PROBES WHICH ACT AS A MODE SEPARATOR

Roger H. Fricke, Haddonfield, and Joseph F. McSparran, Merchantville, N.J., assignors to the United States of America as represented by the Secretary of the Army Filed May 25, 1961, Ser. No. 112,739
1 Claim. (Cl. 330—56)

This invention relates to microwave cavity resonators, and more particularly to broad-band microwave cavity resonators including means to control the separation of the two mode resonances.

In designing electronics equipment, size and weight are often critical items. If size and weight are critical in a circuit using cavity resonators, it is desirable to use a box-type cavity that is capacitively tuned rather than the larger and heavier conventional coaxial type cavities, or box-type cavities with inductance tuning. However, certain problems are encountered when one attempts to broad-band tune a capacitively-tuned box-type cavity that is used as the resonant circuit for an electron tube such as a planar triode similar to the 2C39A.

One of the problems encountered is that of mode jumping. That is, when the cavity is tuned through its fundamental mode the frequency separation between the fundamental mode and the second mode will at some point in the frequency band be so small that the cavity will at this point jump to the second mode.

Another problem encountered with this type of cavity is that doubling may occur, so that one cannot positively ascertain what frequency of resonance has been established for a given tuner position. This doubling occurs because, for a given position of the tuning device, the cavity is then resonant at the frequency of the second mode, which is exactly twice the frequency of the fundamental mode for that position of the tuning device. These problems will be made clearer later in this specification.

Prior art attempts to overcome the mode-jumping and doubling problems without sacrifice of optimum performance have not been very successful.

The present invention overcomes the above mentioned problem and maintains optimum performance over a wide band with but one tuning control per cavity by symmetrically placing a plurality of probes around the grid contact ring of the cavity. These probes add additional capacitance across the tube.

An object of this invention is to provide a broad-band capacitively-tuned box type cavity resonator that gives optimum performance over the entire band of interest with but one tuning control means.

Another object of this inveniton is to provide a broad-band capacitively-tuned box type resonator that operates over the entire band of interest without mode jumping.

A further object of this invention is to provide a broad-band capacitively-tuned box type cavity resonator in which no ambiguity as to frequency of operation for a given tuner position can exist.

A still further object of this invention is to provide a microwave cavity mode separator.

The above mentioned and other objects will become more apparent from the following description and accompanying drawings in which.

Figure 1:
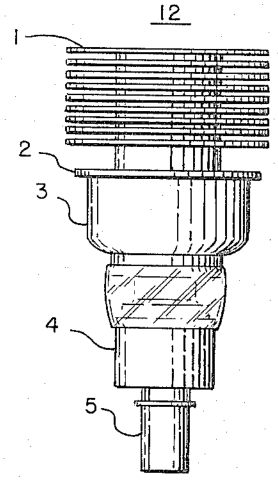
FIG. 1 shows a planar type triode that may be used in this invention.
Figure 2:
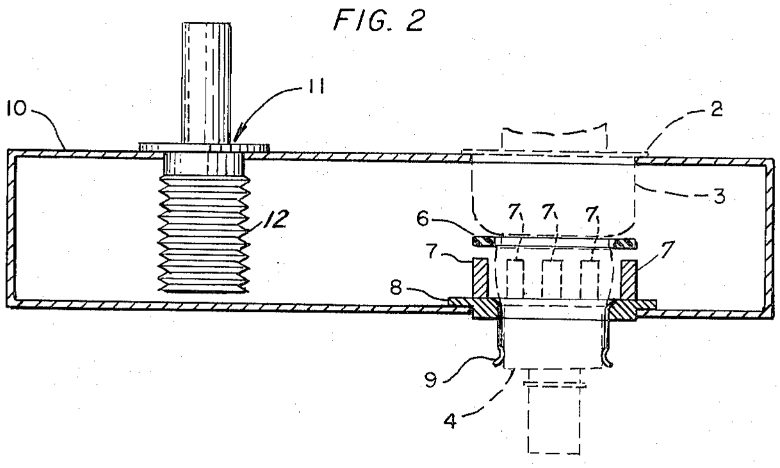
FIG. 2 shows a preferred embodiment of the invention.

FIG. 1 shows a planar triode 12 of the 2C39A type. Triode 12 comprises a heat radiator 1, a flange 2, an anode contact surface 3, a grid contact surface 4, and a cathode contact surface 5. As shown in FIG. 2, openings of the proper size to accept the respective contact surfaces are provided in cavity 10 for triode 12. The triode is placed through the openings in such a manner that anode surface 3, and, of course the anode itself, is housed within the cavity. Pressure contact is made with grid surface 4 by means of spring clips 9. Spring clips 9 are used as grid terminals, and while only two such clips are shown in FIG. 2, a grid contact ring comprising a plurality of these clips is usually provided so that electrical contact is made around the entire grid contact surface. Cavity 10 is tuned by means of a single bellows tuner 11. Tuner 11 is a conventional type bellows tuner. The name "bellows" is derived from the fact that the wall of part 12 of the tuner expands and contracts similarly to an air bellows, or the bellows of an accordion. It permits the tuning element to move in and out without the use of a sliding contact. A plurality of probes 7 are symmetrically placed around grid contact ring 8. These probes introduce additional capacitance across the tube. A thin ring of mica 6 is placed between probes 7 and anode surface 3 to prevent arcing and to develop the desired amount of capacitance between probes 7 and the lower surface of anode contact 3.

Figure 3:
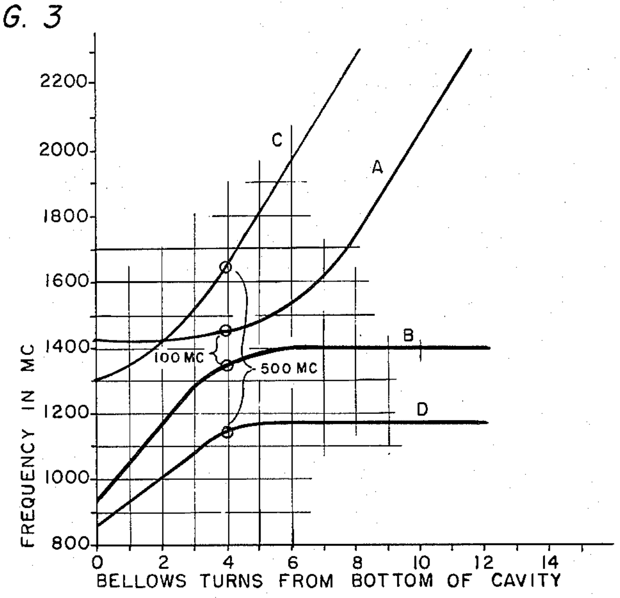
FIGS. 3 and 4 are graphs explaining the operation of this invention.
Figure 4:
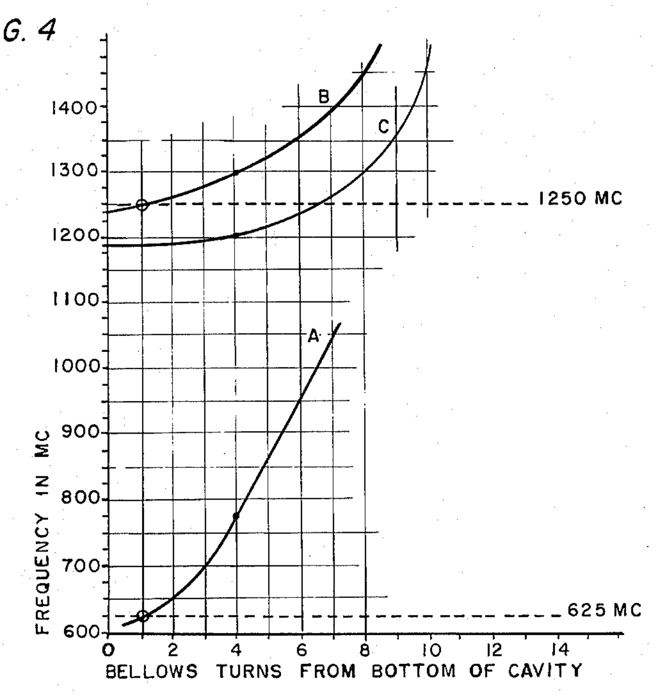

The operation of the resonator shown in FIG. 2 will now be described with reference to FIGS. 3 and 4. An attempt was made to operate a conventional cavity, that is, a cavity without probes 7, over a frequency range of 1350 to 1850 mc. For this frequency range the cavity was operated in the second mode of resonance; however, mode jumping occurred when the cavity was operated as a two cavity oscillator. In FIG. 3 curve A is the second mode curve and curve B is the fundamental mode curve of the conventional capacitively tuned box type cavity. At the knee of the second mode (curve A) say 1450 mc., the "Q" of the cavity was considerably lower than the "Q" of the cavity at 1300 mc. in the fundamental mode (curve B). This was an indication that the separation between the fundamental mode and the second mode was not wide enough, and that the unloaded "Q" of the cavity was too low in the second mode to maintain a discrimination between the two modes. The mode-jumping occurred between the three and four turn positions of the bellows, and from FIG. 3 it is apparent that for these positions of the bellows the frequency spread between the modes is comparatively small. In FIG. 3, curves C and D represent the tuning range of the second and fundamental mode resonances, respectively, of the present invention. Probes 7 add an effective capacitance across the tube at the lower frequencies. The effect of this capacitance becomes apparent by comparing curve C with curve A and curve B with curve D. For a given bellows position the frequencies along curve D are lower than the frequencies along curve B. Likewise, for a given bellows position the frequencies at the lower end of curve C are lower than the frequencies along the lower end of curve A. In other words, the mode curves have been shifted by the addition of the probes and have been shifted in such a manner that the frequency spread between the fundamental mode and the second mode is large enough over the entire tuning range to prevent mode jumping. For example, at the four-turn bellows position, the frequency spread between curves C and D is approximately 500 mc.; whereas, for this bellows position the frequency spread between curves A and B without its probes is only 100 mc.

If one attempts to operate a conventional cavity having a triode similar to triode 12 at frequencies lower than those shown in FIG. 3, frequency doubling is usually encountered. In FIG. 4 curve A represents the fundamental mode of a conventional cavity, and curve B represents the second mode of this cavity. At approximately the one-turn bellows position the frequency of the fundamental mode is 625 mc. (curve A) and the frequency of the second mode is exactly twice 625 or 1250 mc. (curve B). Thus, if the cavity is operating at 1250 mc. for this position of the bellows, it is not possible to determine whether or not the 1250 mc. represents the second harmonic of the fundamental mode or a fundamental frequency of the second mode. Curve C of FIG. 4 represents the tuning range of the second mode with probes 7 added to the cavity. The capacitance added by these probes lowers the frequency range of the second mode in such a manner that for any given bellows position the frequency of the second mode is not twice the frequency of the fundamental mode.

From the foregoing remarks it is obvious that the cavity of the present invention can be operated over a wide frequency band without any mode jumping or frequency doubling. It is also noted that the power output of the cavity is an optimum over the entire band and that only one tuning device is needed to obtain trouble-free wideband operation.

While a particular embodiment of the invention has been shown and described, it will be obvious to those skilled in the art that changes and modifications may be made without departing from the scope and spirit of the invention, as set forth in the appended claim.

We claim:

A microwave cavity mode-separator comprising: a rectangular box-type cavity having top and bottom walls; a single bellows-type tuning probe extending into said cavity through one end of said top cavity wall; a circular opening in the end of said top wall opposite said tuning probe location; a second circular opening in said bottom wall axially aligned with said first opening; a plurality of spring clips extending through said bottom wall opening and arranged to form a grid contact ring; a planar triode having at least an anode contact surface and a grid contact surface, said triode being placed through said openings such that said anode contact surface is within said cavity adjacent to said top wall and said grid contact surface extends through said bottom wall opening and contacts said spring clips; a plurality of capacitance probes mounted within said cavity symmetrically around said bottom wall opening and extending from said bottom wall toward said anode contact surface; and a mica ring placed between said anode contact surface and said capacitance probes.

References Cited by the Examiner

UNITED STATES PATENTS

| | | | |
|---|---|---|---|
| 2,502,456 | 4/50 | Hansen et al. | 333—98 |
| 2,688,122 | 8/54 | Edson | 333—98 |
| 2,806,951 | 9/57 | Willwacher et al. | 330—56 X |
| 2,867,726 | 1/59 | Preist | 330—56 X |
| 2,899,647 | 8/59 | Willwacher | 333—83 |
| 3,153,767 | 10/64 | Kyhl | 331—31 |

ELI LIEBERMAN, *Acting Primary Examiner.*

RUDOLPH V. ROLINEC, NATHAN KAUFMAN, HERMAN KARL SAALBACH, *Examiners.*